(12) United States Patent
Weh

(10) Patent No.: US 10,144,400 B2
(45) Date of Patent: Dec. 4, 2018

(54) HYDRAULIC PUMP ASSEMBLY FOR A HYDRAULIC VEHICLE BRAKE SYSTEM, HYDRAULIC VEHICLE BRAKE SYSTEM WITH SUCH A HYDRAULIC PUMP ASSEMBLY AND METHOD FOR MANUFACTURING THE HYDRAULIC PUMP ASSEMBLY

(71) Applicant: Robert Bosch GmbH, Stuttgart (DE)

(72) Inventor: Andreas Weh, Sulzberg (DE)

(73) Assignee: Robert Bosch GmbH, Stuttgart (DE)

( * ) Notice: Subject to any disclaimer, the term of this patent is extended or adjusted under 35 U.S.C. 154(b) by 295 days.

(21) Appl. No.: 14/650,306

(22) PCT Filed: Oct. 7, 2013

(86) PCT No.: PCT/EP2013/070827
§ 371 (c)(1),
(2) Date: Jun. 7, 2015

(87) PCT Pub. No.: WO2014/086517
PCT Pub. Date: Jun. 12, 2014

(65) Prior Publication Data
US 2015/0322931 A1    Nov. 12, 2015

(30) Foreign Application Priority Data

Dec. 7, 2012  (DE) .................. 10 2012 222 575

(51) Int. Cl.
| | | |
|---|---|---|
| *B60T 8/40* | (2006.01) | |
| *F04B 15/00* | (2006.01) | |
| *F04B 39/14* | (2006.01) | |
| *B60T 13/16* | (2006.01) | |
| *H02K 7/10* | (2006.01) | |

(Continued)

(52) U.S. Cl.
CPC ............ *B60T 8/4018* (2013.01); *B60T 13/16* (2013.01); *F04B 15/00* (2013.01); *F04B 17/03* (2013.01);

(Continued)

(58) Field of Classification Search
CPC ...... B60T 8/4018; B60T 13/16; B60T 13/745; F04B 15/00; F04B 17/03; F04B 39/14;

(Continued)

(56) References Cited

U.S. PATENT DOCUMENTS 4,481,864 A * 11/1984 Peruzzi .................... B66F 3/30
                                                                188/82.2
4,756,391 A *  7/1988 Agarwal .................. B60T 8/00
                                                                188/106 P (Continued)

FOREIGN PATENT DOCUMENTS

DE    195 13 346 A1    10/1996
DE    197 08 142 A1     9/1998

(Continued)

OTHER PUBLICATIONS

International Search Report corresponding to PCT Application No. PCT/EP2013/070827, dated Nov. 20, 2013 (German and English language document) (8 pages).

*Primary Examiner* — Patrick Hamo
*Assistant Examiner* — Joseph Herrmann
(74) *Attorney, Agent, or Firm* — Maginot, Moore & Beck LLP

(57) ABSTRACT

A hydraulic pump assembly for a hydraulic vehicle brake system includes a drive motor, preferably an electric motor, and a piston pump. The hydraulic pump assembly has a worm gear, preferably a ball screw unit, which converts a rotating output movement of the drive motor into a translatory drive movement of the piston pump or the pump piston. A method is provided for manufacturing the hydraulic pump assembly. A vehicle brake system includes the hydraulic pump assembly.

15 Claims, 1 Drawing Sheet

(51) Int. Cl.
*F04B 17/03* (2006.01)
*H02K 7/06* (2006.01)
*H02K 7/14* (2006.01)

(52) U.S. Cl.
CPC ............... *F04B 39/14* (2013.01); *H02K 7/06* (2013.01); *H02K 7/10* (2013.01); *H02K 7/14* (2013.01); *F04B 2203/02* (2013.01); *Y10T 29/49238* (2015.01)

(58) Field of Classification Search
CPC ........ F04B 2203/02; H02K 7/06; H02K 7/10; H02K 7/14; F15B 15/068
USPC .......................................................... 417/489
See application file for complete search history.

(56) References Cited

U.S. PATENT DOCUMENTS

| | | | | |
|---|---|---|---|---|
| 4,885,910 A | * | 12/1989 | Resch | B60T 11/20 60/562 |
| 4,918,921 A | * | 4/1990 | Leigh-Monstevens | B60T 13/745 310/83 |
| 5,130,585 A | * | 7/1992 | Iwamatsu | H02K 9/00 310/52 |
| 5,722,744 A | * | 3/1998 | Kupfer | B60T 7/042 303/10 |
| 5,788,341 A | * | 8/1998 | Penrod | B60T 8/00 188/156 |
| 5,876,189 A | * | 3/1999 | Lukas | F04B 1/12 417/269 |
| 6,230,492 B1 | * | 5/2001 | Kingston | B60T 13/745 60/545 |
| 2012/0160043 A1 | * | 6/2012 | Drumm | F16H 25/20 74/89.23 |

FOREIGN PATENT DOCUMENTS

| | | | |
|---|---|---|---|
| DE | 19708142 A1 | * 9/1998 | ............. B60T 8/348 |
| EP | 2 083 171 A1 | 7/2009 | |
| JP | H04-22767 A | 1/1992 | |
| WO | 98/17514 A1 | 4/1998 | |
| WO | 01/42655 A1 | 6/2001 | |
| WO | 2006/108653 A1 | 10/2006 | |

* cited by examiner

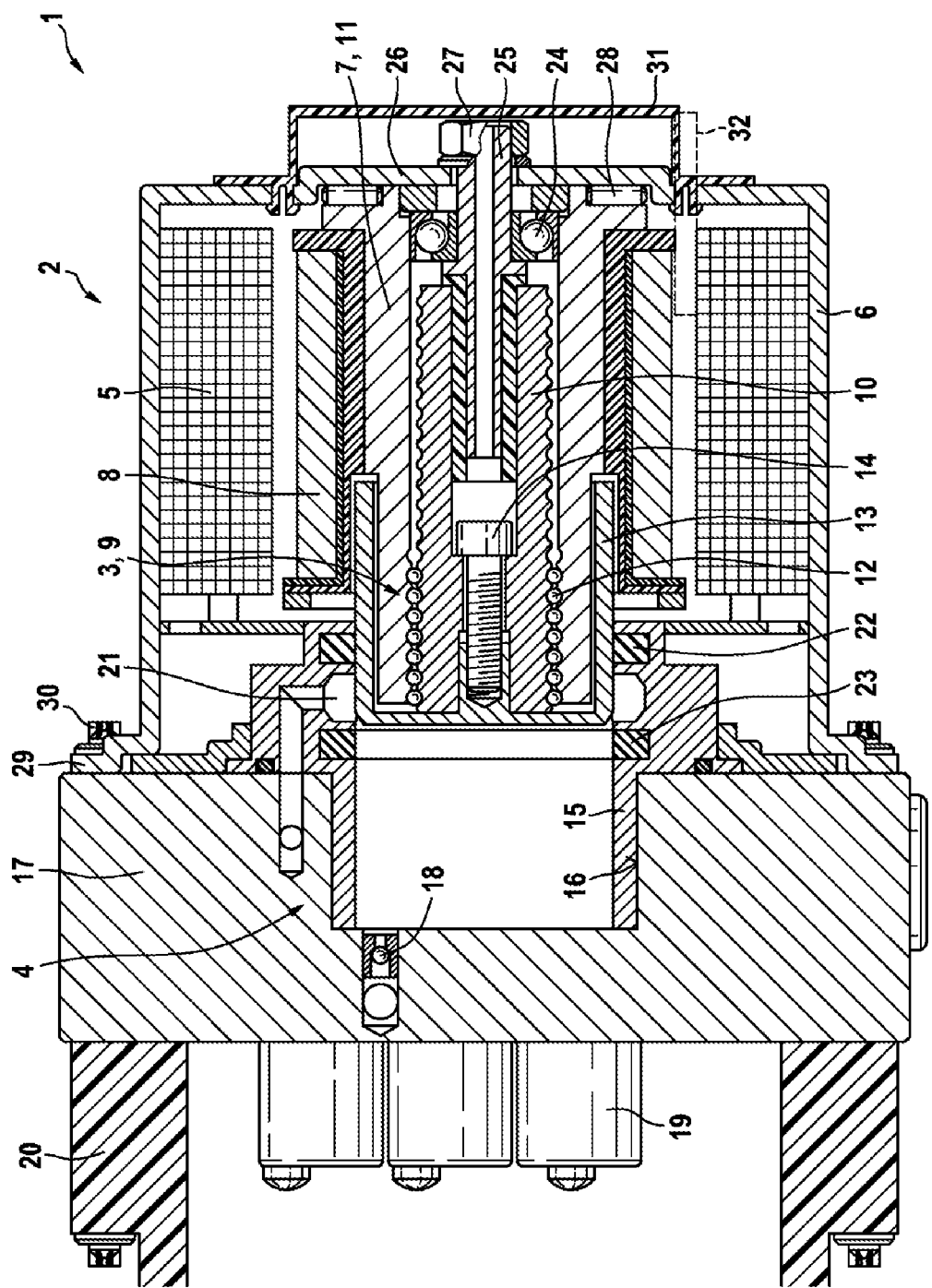

HYDRAULIC PUMP ASSEMBLY FOR A HYDRAULIC VEHICLE BRAKE SYSTEM, HYDRAULIC VEHICLE BRAKE SYSTEM WITH SUCH A HYDRAULIC PUMP ASSEMBLY AND METHOD FOR MANUFACTURING THE HYDRAULIC PUMP ASSEMBLY

This application is a 35 U.S.C. § 371 National Stage Application of PCT/EP2013/070827, filed on Oct. 7, 2013, which claims the benefit of priority to Serial No. DE 10 2012 222 575.7, filed on Dec. 7, 2012 in Germany, the disclosures of which are incorporated herein by reference in their entirety.

BACKGROUND

The disclosure relates to a hydraulic pump assembly for a hydraulic vehicle brake system. It is used to build up pressure during a slip control operation or, alternatively, for a power braking operation and for returning brake fluid from wheel brakes during or after a slip control operation. Slip control systems include antilock control systems, traction control systems and/or electronic stability control systems, the latter also being referred to in common parlance as antiskid control systems. Common abbreviations for such control systems are ABS, ASR, FDR and ESP. Moreover, the disclosure relates to a hydraulic vehicle brake system with a hydraulic pump assembly of this kind and to a production method or centering of a rotor in a stator of an electric motor of the hydraulic pump assembly.

Piston pumps having one pump element for each brake circuit, in the typical case of two brake circuits therefore one piston pump with two pump elements, are nowadays conventional in slip-controlled hydraulic vehicle brake systems. The pump elements are arranged coaxially in a horizontally opposed arrangement on both sides of an eccentric arranged between them. The eccentric can be driven in rotation by means of an electric motor and the axis thereof is radial with respect to the pump elements. Pump pistons rest by means of mutually facing ends on the outside circumference of the eccentric and, during a rotary motion of the eccentric, are driven to perform a reciprocating motion, by means of which they deliver brake fluid in a manner known per se.

SUMMARY

The hydraulic pump assembly according to the disclosure has a drive motor, in particular an electric motor, a piston pump and a screw mechanism, which converts a rotary output motion of the drive motor into a translatory drive motion of the piston pump. The disclosure allows a compact hydraulic pump assembly which can be preinstalled as a subassembly and can be checked before ability to operate before being installed or mounted a hydraulic block, for example. The screw mechanism allows a long stroke of the piston pump irrespective of a transmission ratio of the mechanism and allows a choice of transmission ratio for the mechanism by way of a pitch of the screw mechanism.

The dependent claims relate to advantageous embodiments and developments of the hydraulic pump assembly.

A compact construction with good utilization of installation space is made possible by the disclosure, which envisages an electric motor in the form of a hollow shaft motor as a drive motor for the hydraulic pump assembly. The screw mechanism is arranged in the hollow shaft of the electric motor, and can project from the hollow shaft, i.e. axially beyond the electric motor. The hollow shaft of the electric motor can be designed as the motor of the screw mechanism.

The disclosure further envisages that a part of the screw mechanism which moves in translation during driving of the screw mechanism has a piston of the piston pump. A nut or the like of the screw mechanism can be driven in rotation, and a spindle of the screw mechanism can move in translation, this being envisaged per se, or conversely the spindle can be driven in rotation, causing the nut or the like of the screw mechanism to move in translation. In the first case, the spindle and, in the latter case, the nut is the part of the screw mechanism which moves in translation during driving. In the first case, that of the screw mechanism spindle moving in translation, which is the case envisaged per se, the spindle can have a piston of the piston pump or, alternatively, the spindle, in particular one end of the spindle, can be designed as the piston of the piston pump. However, a spindle driven in rotation combined with a nut driven in translation is likewise possible according to the disclosure.

A hydraulic vehicle brake system having a hydraulic pump assembly of the type explained above is disclosed.

A method directed to centering of a rotor of an electric motor of the hydraulic pump assembly for precise setting of an air gap between the rotor and a stator in a manner which is uniform over the circumference is disclosed.

BRIEF DESCRIPTION OF THE DRAWING

The disclosure is explained in greater detail below by means of an illustrative embodiment shown in the drawing. The single FIGURE shows a hydraulic pump assembly in accordance with the disclosure in axial section.

DETAILED DESCRIPTION

The hydraulic pump assembly 1 according to the disclosure, which is shown in the drawing, has an electric motor 2 as a drive motor, a screw mechanism 3 and a piston pump 4. The electric motor 2 has a stator 5 having stator windings, which are arranged in a pot-shaped motor housing 6, which can also be referred to as a pole pot. The electric motor 2 is designed as a hollow shaft motor, having a tubular hollow shaft 7 with permanent magnets 8 on the outside thereof. The hollow shaft 7 with the permanent magnets 8 forms a rotor of the electric motor 2.

The screw mechanism 3 has a ball screw drive 9 having a hollow spindle 10 and a nut 11, which is formed by the hollow shaft 7 of the electric motor 2. The screw mechanism 3 is arranged coaxially in the hollow shaft 7 of the electric motor 2 and projects somewhat from the rotor on just one side only in the retracted position shown. To form the nut 11, the hollow shaft 7 has a helical channel on the inside, as is known from ball screw drives, in which balls 12 rest. The balls 12 rest in a likewise helical groove on the hollow spindle 10, so that, when the hollow shaft 7, which forms the nut 11 of the ball screw drive 9, is rotated, the hollow spindle 10 is moved axially.

On the end which projects from the rotor, the hollow spindle has a piston 13. The piston 13 is designed as a tubular hollow piston, which is open on one side and the closed side of which is secured on the end of the hollow spindle 10 by means of a screw 14, which is arranged in the hollow spindle 10. The open side of the piston 13 faces the screw mechanism 3 and the piston 13 surrounds the nut 11 of the ball screw drive 9. Between the piston 13 and the nut 11 there is an annular gap, allowing the nut 11 to be rotated in the piston 13.

The piston 13 enters a short distance into a tubular cylinder 15, into which it can be moved by rotary driving of the electric motor 2. The piston 13 and the cylinder 15 are coaxial with the screw mechanism 3 and with the electric motor 2.

The cylinder 15 is accommodated in a cylindrical countersink in a hydraulic block 17, which is here referred to as a cylinder bore 16. Opening into a bottom of the cylinder bore 16 is a connection bore, into which a check valve 18 is pressed in the illustrative embodiment.

The hydraulic block 17 is a component which is known per se from anti-slip control systems in hydraulic vehicle brake systems and is usually a flat, cuboidal component made of metal, especially aluminum, in which countersinks and blind holes are made as receptacles for and for the installation of hydraulic component elements of an anti-slip control system. Such component elements are, for example, hydraulic pumps, solenoid valves, hydraulic accumulators etc. The hydraulic component elements are interconnected in the hydraulic block 17 hydraulically by bores. In the drawing, solenoid valves 19, the coils of which project from the hydraulic block 17, can be seen opposite the electric motor 2. The solenoid valves 19 are covered by a cover 20.

Outside the hydraulic block 17, the cylinder 15 has on the circumference a snifter hole 21 of the kind known from brake master cylinders. In the retracted position shown, the snifter hole 21 is not completely covered by the piston 13, with the result that an interior of the cylinder 15 communicates with a brake master cylinder (not shown) or a brake fluid reservoir (not shown) of the hydraulic vehicle brake system by means of the snifter hole 21 and bores in the hydraulic block 17. If the piston 13 is moved into the cylinder 15, it travels over the snifter hole 21 at the beginning of its movement and thereby separates the interior of the cylinder 15 from the brake master cylinder or the brake fluid reservoir, as is known from brake master cylinders. Through further movement of the piston 13 into the cylinder 15, the piston 13 displaces brake fluid from the cylinder 15 through port 18. During a return movement, the piston 13 draws brake fluid into the cylinder 15 again.

The piston 13 is sealed off by means of two cup packings 22, 23, which are arranged on both sides of the snifter hole 21, viewed axially with respect to the cylinder. One cup packing 22 seals off the piston 13 at all times, while the other cup packing 23 is crossed by the piston 13 after it has crossed the snifter hole 21, and this cup packing 23 forms a seal against high pressure between the piston 13 and the cylinder 15 when the piston 13 is moved into the cylinder 15.

The piston 13 is guided in an axially movable manner in the cylinder 13. The hollow shaft 11 of the electric motor 2 is supported at its cylinder end by the piston 13, the hollow spindle 10, on the end of which the piston 13 is secured, and the balls 12 of the ball screw drive 9. At an end remote from the cylinder, the hollow shaft 11 is supported rotatably by means of a rotary bearing, in the illustrative embodiment an angular ball bearing 24, which is pressed into its end. The angular ball bearing 24 is pressed onto a guide pin 25, which is secured on a closed side of the pot-shaped motor housing 6, which is referred to here as the housing end wall 26. After being aligned coaxially with the cylinder 15, the guide pin 25 is secured on the housing end wall 26 by means of a nut 27, which is screwed onto a thread of the guide pin 25 from the outside. In the part which projects into the hollow spindle 10, the guide pin 25 is designed as a hexagon and interacts with an internal hexagon of the hollow spindle 10, which is thereby held and guided in an axially movable manner and for conjoint rotation on the guide pin 25 by means of positive engagement. By means of an axial needle bearing 28, the hollow shaft 11 of the electric motor 2 is supported axially on the inside on the housing end wall 26 of the motor housing 6. The guide pin 25 has a plain bearing bush made of plastic for sliding support and axially movable guidance of the hollow shaft 10.

The piston 13 is supported axially on the hollow spindle 10, on the end of which it is secured, against a pressure which the piston 13 produces when it is moved into the cylinder 15. The hollow spindle 10 transmits the axial force to the hollow shaft 11 of the electric motor 2 via the balls 12 of the ball screw drive 12. This is supported axially via the axial needle bearing 28 on the housing end wall 26 of the motor housing 6 forming the pole pot, said housing having, at its open side facing the hydraulic block 17, a flange 29, at which it is secured on the hydraulic block 17 by means of screws 30. In this way, a force transmission path is closed.

During an axial movement, an air volume in the hollow spindle 10 changes. An interior of the hollow spindle 10 communicates via the guide pin 25, which has an axial through hole for this purpose, with an interior of a plastic cover 31, which is placed on the housing end wall 26 of the motor housing 6. Via openings in the housing end wall 26, which are not visible in the drawing, the interior of the plastic cover 31 communicates with an interior of the motor housing 6, with the result that air is admitted to and released from the interior of the hollow spindle 10 and pressure equalization for the changing air volume in the hollow spindle 10 is ensured.

To center the hollow shaft 7, which forms the rotor of the electric motor 2 with the permanent magnets 8, in the stator 5, three or more gauges 32 are inserted into an air gap between the rotor and the stator 5 through openings in the housing end wall 26 in a manner distributed uniformly or non-uniformly over the circumference before the plastic cover 31 is placed on the housing end wall 26 of the motor housing 6 and before the nut 27 with which the guide pin 25 is secured on the housing end wall 26 is tightened. The gauges 32 form spacers, by means of which the rotor is centered in the stator 5, with the result that the air gap between the rotor and the stator 5 has exactly the same width over the circumference. This makes possible a narrow air gap which is important for a high efficiency of the electric motor 2. After centering, the nut 27 is tightened and the gauges 32 are then pulled out.

The electric motor 2, the screw mechanism 3, the piston 13 and the cylinder 15 form a subassembly which is preassembled and checked for its ability to operate before it is secured on the hydraulic block 17.

The invention claimed is:
1. A hydraulic pump assembly for a hydraulic vehicle brake system, comprising:
   a drive motor;
   a piston pump that includes:
      a cylinder that has a snifter hole opening into an interior of the cylinder, wherein the snifter hole includes an annular groove formed in an inner circumference of the cylinder; and
      a piston that is axially movable within the cylinder between a retracted position and a displaced position, wherein the snifter hole is not closed when the piston is in the retracted position allowing for communication with the interior of the cylinder via the snifter hole, and wherein the piston closes off the snifter hole as the piston moves from the retracted position toward the displaced position; and a screw mechanism configured to convert a rotary output motion of the drive motor into an axial motion of the piston to drive the piston pump.

2. The hydraulic pump assembly as claimed in claim 1, wherein the screw mechanism has a ball screw drive or a roller screw drive.

3. The hydraulic pump assembly as claimed in claim 1, wherein the drive motor is an electric motor.

4. The hydraulic pump assembly as claimed in claim 1, wherein the piston pump is arranged in a hydraulic block, which is part of a hydraulic open-loop control system or a hydraulic closed-loop control system of the hydraulic vehicle brake system, and wherein the drive motor is mounted on the hydraulic block.

5. The hydraulic pump assembly as claimed in claim 4, wherein the drive motor is an electric motor having a hollow shaft that forms a nut of the screw mechanism.

6. The hydraulic pump assembly as claimed in claim 4, wherein the screw mechanism has a hollow spindle with an interior and an air admission opening configured to admit air into the interior and release air from the interior.

7. The hydraulic pump assembly as claimed in claim 1, wherein:
the drive motor includes a motor shaft that defines a first hollow portion;
the screw mechanism includes a spindle that moves axially in the first hollow portion in response to a rotary output motion of the motor shaft;
the piston is axially secured to the spindle so that axial motion of the spindle drives the movement of the piston in the cylinder;
the piston defines a second hollow portion; and
in the retracted position of the piston, the first hollow portion is within the second hollow portion.

8. The hydraulic pump assembly as claimed in claim 7, wherein:
the first hollow portion has an internal threading
the spindle has an externally threaded portion operatively engaged with the internal threading of the first hollow portion.

9. The hydraulic pump assembly as claimed in claim 7, wherein
the piston is separated from the motor shaft by an annular gap.

10. The hydraulic pump assembly of claim 7, further comprising:
a first cup packing element positioned in a first circumference of the cylinder such that the first cup packing element seals off the second hollow portion of the piston from the cylinder.

11. The hydraulic pump assembly of claim 10, further comprising:
a second cup packing element positioned in a second circumference of the cylinder at an axial location between the snifter hole and a location of the piston in the displaced position, such that the second cup packing element is not in contact with the piston when the piston is in the retracted position, and such that the second cup packing element is configured to seal off the second hollow portion of the piston from the cylinder and seal the snifter hole, thereby stopping the communication with the interior of the cylinder via the snifter hole, as the piston moves axially past the second cup packing element toward the displaced position.

12. The hydraulic pump assembly of claim 1, wherein the communication via the snifter hole is configured to connect the interior of the cylinder to at least one of a brake master cylinder and a brake fluid reservoir.

13. The hydraulic pump assembly of claim 12, wherein the snifter hole is at an axial location in the cylinder proximate to a location of the piston in the retracted position relative to a location of the piston in the displaced position.

14. A hydraulic vehicle brake system, comprising:
a hydraulic pump assembly including:
a drive motor;
a piston pump that includes:
a cylinder that has a snifter hole opening into the cylinder, wherein the snifter hole includes an annular groove formed in an inner circumference of the cylinder; and
a piston that is axially movable within the cylinder between a retracted position and a displaced position, wherein the snifter hole is not closed when the piston is in the retracted position allowing for communication with the interior of the cylinder via the snifter hole, and wherein the piston closes off the snifter hole as the piston moves from the retracted position toward the displaced position; and
a screw mechanism configured to convert a rotary output motion of the drive motor into an axial motion of the piston to drive the piston pump.

15. A method for producing a hydraulic pump assembly including a drive motor, a piston pump, and a screw mechanism, the piston pump including: a cylinder that has a snifter hole opening into an interior of the cylinder, wherein the snifter hole includes an annular groove formed in an inner circumference of the cylinder, and including a piston that is axially movable within the cylinder between a retracted position and a displaced position, wherein the snifter hole is not closed when the piston is in the retracted position allowing for communication with the interior of the cylinder via the snifter hole, the piston closing off the snifter hole as the piston moves from the retracted position toward the displaced position, the screw mechanism being configured to convert a rotary output motion of the drive motor into an axial motion of the piston to drive the piston pump, the drive motor being an electric motor configured as a hollow shaft motor, the screw mechanism being arranged in a hollow shaft of the hollow shaft motor, the method comprising:
centering the hollow shaft of the electric motor by inserting gauges into an air gap between a stator and a rotor of the electric motor prior to fixing the hollow shaft in place, wherein: the rotor includes the hollow shaft; and the gauges are inserted so as to be distributed either uniformly or non-uniformly over a circumference of the air gap.

\* \* \* \* \*